United States Patent Office 3,589,990
Patented June 29, 1971

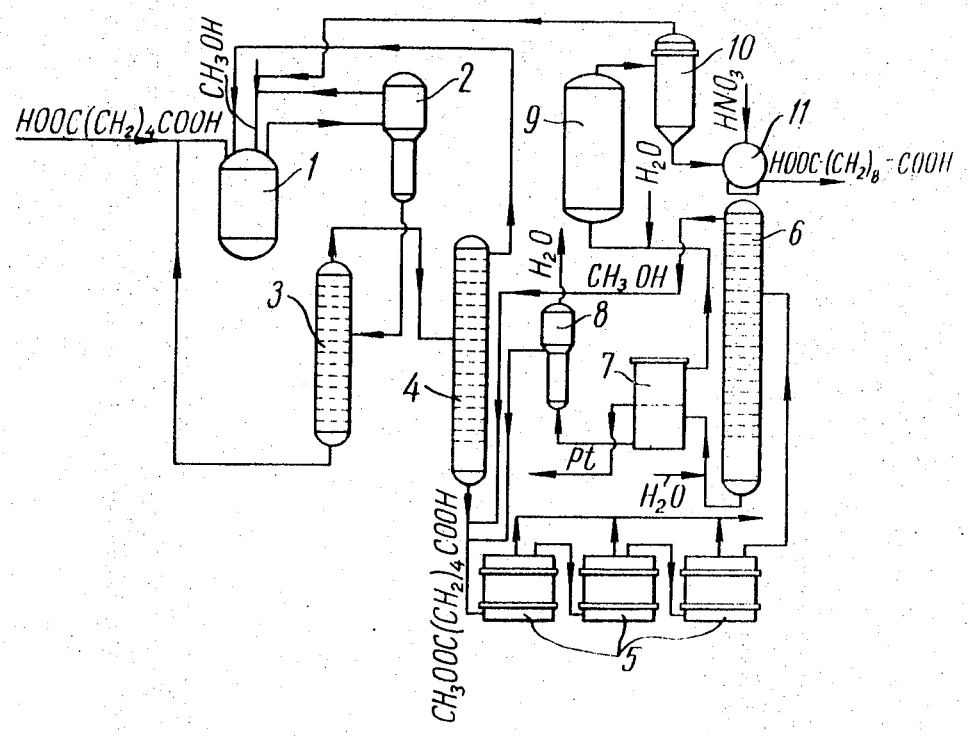

3,589,990
PROCESS FOR THE PRODUCTION OF
SEBACIC ACID
Gilya Naumovich Freidlin, Tula, Jury Mikhailovich Tjurin, Gorky, Evgeny Pavlovich Kovsman, Tula, Ary Artemievich Adamov, Nikolai Alexandrovich Kochergin, Izrail Yakovievich Lubyanitsky, Alexandr Semenovich Nalivaiko, Svetlana Mikhailovna Posternak, and Maxim Leibovich Ferd, Severodonetsk Luganskoi oblast, Olga Tikhonovna Kofanova, Tula, Sergei Mikhailovich Shtefan, Alexei Danilovich Kovalev, Margarita Sergeevna Timagina, and Alexandr Stepanovich Buerakov, Severodonetsk Luganskoi oblast, and Mikhail Yakovlevich Fioshin and Ljudmila Ivanovna Kazakova, Moscow, U.S.S.R., assignors to Vsesojuzny Nauchno-Issledovatelsky I Proektny Institut Monomerov, Tula, U.S.S.R.
Filed Feb. 29, 1968, Ser. No. 709,346
Int. Cl. C07b 29/06
U.S. Cl. 204—72
14 Claims

ABSTRACT OF THE DISCLOSURE

A process for the production of sebacic acid in which monomethyl adipate is electrolytically condensed to dimethyl sebacate in a methanolic medium in the presence of an alkali metal monomethyl adipate, after which the obtained mixture is stripped of methanol and allowed to stand to form an ester layer containing dimethyl sebacate and a layer containing alkali metal monomethyl adipate. The ester layer is removed and subjected to a first hydrolysis with water and subsequently to a second hydrolysis in an aqueous solution of a mineral acid, after which the formed sebacic acid is recovered.

The present invention relates to methods for the production of sebacic acid by electrolytic condensation of monoalkyl adipates. More particularly it relates to a method for the production of sebacic acid by electrolytic condensation of monomethyl adipate.

Sebacic acid is widely used for manufacturing sebacic acid esters, used as plasticizers in the production of high grade nylon 610 fibers and for the production of low-temperature lubricants.

Heretofore, the most extensively employed commercial method of producing sebacic acid was the alkaline decomposition of castor oil.

The yield of sebacic acid thus produced is rather small.

Another known method for the production of sebacic acid by electrolytic condensation of monomethyl adipate comprises three main stages: production of monomethyl adipate, electrolytic condensation of the monomethyl adipate to dimethyl sebacate and separation of the sebacic acid. By the latter known method, the monomethyl adipate was prepared by esterification of adipic acid with methanol in the presence of sulfuric acid as a catalyst and dimethyl adipate.

The monomethyl adipate was removed from the esterification products by vacuum distillation.

The electrolyte was prepared by dissolving monomethyl adipate and sodium carbonate in methanol. The electrolytic condensation was carried out in an electrolyzer without a diaphragm. The obtained dimethyl sebacate was either separated as the final product, or it was used for the production of sebacic acid by alkaline saponification and subsequent acidification of the formed salt of sebacic acid by a mineral acid. The sebacic acid produced by this method has a melting point of 130–131° C. and an acid number of 540 mg. KOH/g.

The disadvantages of this method lie in the consumption of considerable amounts of alkali and mineral acid during the conversion of dimethyl sebacate into sebacic acid, and also in the formation of an alkali metal salt, e.g. sodium sulfate as an undesirable by-product. The sebacic acid produced by this method does not meet the present requirements for the sebacic acid used for manufacturing a number of products.

There is now provided according to the invention an improved method for the production of sebacic acid by electrolytic condensation of monomethyl adipate.

The primary object of the present invention is to provide a method for the production of a substantially pure sebacic acid, and also to avoid the formation of undesirable by-products.

The above and other objects have been accomplished according to the present invention, by a method wherein a solution of monomethyl adipate is, in the presence of an alkali metal monomethyl adipate in a methanol medium, subjected to electrolytic condensation.

Dimethyl sebacate is separated from the produced mixture of electrolytic condensation products and thereafter is converted into sebacic acid, and recovered.

According to the present invention, methanol is stripped from the mixture of the electrolytic condensation products, and after being allowed to stand, this mixture is separated into an ester layer and a layer containing substantially an alkali metal monomethyl adipate. The ester layer containing substantially dimethyl sebacate is separated and subjected to hydrolysis in two steps—first by water, and then by a water solution of a mineral acid. Hydrolysis by water is carried out in an autoclave under superatmospheric pressure at a temperature above 100° C. and not less than a fourfold excess of water in respect to the ester layer (by weight). The hydrolysis by water is preferably performed under a pressure of 35–50 atm. at a temperature of 220°–280° C. for 2–5 hours.

Water is perferably utilized in such a quantity, that the water to the ester layer weight ratio is between 6:1 and 10:1.

The hydrolysis with a water solution of a mineral acid, is particularly efficient, when nitric acid is used as the mineral acid.

It is preferred to carry out the hydrolysis with nitric acid at a temperature of about 80–100° C. for 0.5–1.5 hours, the concentration of the acid in the reaction mixture being about 15–25%. Along with the hydrolysis of the residual dimethyl sebacate, there takes place purification of the solution from possible oxidizable impurities.

The sebacic acid, removed from the hydrolysis products, is recrystallized preferably from the water solution; this water solution is preferably purified, for example, with activated carbon. For this purpose the aqueous solution of sebacic acid is contacted with activated carbon at 90–100° C. for 20–40 minutes.

The residual solution of nitric acid from the initial recovery of sebacic acid is preferably partly recycled for the second stage of hydrolysis and partly withdrawn for regeneration of the nitric acid.

It is desirable to recycle the layer containing substantially the alkali metal monomethyl adipate for the electrolytic condensation stage.

It is advantageous, for a better separation into layers of the mixture of the electrolytic condensation products, to add water to this mixture, after stripping methanol therefrom.

The water is preferably added in such quantities, that the water to the mixture weight ratio is between 1:3 and 1:10. Thus a more distinct separation of the ester and the water layers is obtained.

When platinum or platinum-titanium anodes are used for the electrolytic condensation, during the course of separation in layers, there is formed between the ester and the water layers, an intermediate layer in which finely divided platinum accumulates.

Said ester layer containing substantially dimethyl sebacate is treated as described above, i.e., it is hydrolyzed, while the water layer containing the alkali metal monomethyl adipate is evaporated in order to remove the excess water; after the evaporation, the residual alkali metal monomethyl adipate is recycled to the electrolytic condensation stage; the intermediate layer formed at the interface of the ester and the water layers is separated and used for the regeneration of platinum.

The process for the production of sebacic acid, according to the present invention, makes it possible to eliminate losses of alkali and avoid the formation of large amounts of undesirable by-product (alkali metal salt) and also decrease the loss of mineral acid and improve the quality of the sebacic acid obtained. In addition, this method provides regeneration of the alkali metal monomethyl adipate and regeneration of platinum in case platinum or platinum-titanium anodes are used for the electrolytic condensation.

The following example illustrates the preferred embodiment of the present invention with reference to the sole figure of the accompanying drawing. This figure shows a schematic diagram of the process for the production of sebacic acid according to the invention.

The example describes a process for the production of sebacic acid from adipic acid comprising the following stages: preparation of the starting monomethyl adipate; electrolytic condensation of the monomethyl adipate to dimethyl sebacate and production of sebacic acid.

The first stage—obtaining monomethyl adipate—was performed by esterification of adipic acid with methanol, under a pressure of 15 atm. at a temperature of 200° C. in the presence of dimethyl adipate and without a catalyst. The reaction mixture was constituted equimolecular quantities of adipic acid and methanol, while the dimethyl adipate was produced in a quantity equal to the weight of its content at the end of the esterification reaction.

The reaction products formed in esterificator 1 were passed into stripper 2 for stripping off the methanol and then to column 3 for distilling off the mixture of monomethyl and dimethyl adipate. The stripping was performed by live steam under a vacuum of 700 mm. Hg at a temperature of 170° C. The residual adipic acid from the bottom of column 3 was partly recycled to esterificator 1, and partly purified with activated carbon in the methanol solution and then recycled to esterificator 1. The mixture stripped off in column 3 was condensed and separated into an ester and a water layer (not shown in the drawing). The ester layer was separated in rectification column 4 under a vacuum of 710 mm. Hg, and at a temperature in the bottom of the column of 200° C. The dimethyl adipate after leaving the top of rectification column 4 was condensed and recycled to the esterificator 1. The monomethyl adipate leaving the bottom of rectification column 4 was cooled and passed for the preparation of the electrolyte used for the electrolyte condensation. The stage of electrolytic condensation of monomethyl adipate to the dimethyl sebacate was performed as follows: the electrolyte for the electrolytic condensation was prepared by dissolving the monomethyl adipate and the recycled sodium monomethyl adipate in methanol. The thus prepared electrolyte contained 1.5 mole/l. of monomethyl adipate, 0.5 mole/l. of sodium monomethyl adipate and 2.5 mole/l. of water.

The electrolytic condensation was carried out in a cascade of three electrolyzers 5 without diaphragms, connected serially, at a temperature of 58° C. on platinum-titanium anodes and a current density of 670 amp/m.$^2$ The process was performed in such a way, that the electrolyte leaving the last electrolyzer contained about 0.01 mole/l. of monomethyl adipate and about 0.4 mole/l. of sodium monomethyl adipate. The third stage of the production of sebacic acid, according to the present invention, was performed as follows: a mixture of electrolytic condensation products was passed to a rectification column 6, from the last electrolyzer for stripping of methanol. This stripping was carried out under vacuum and at a temperature in the bottom of the column equal to 80° C. The residual mixture of products after stripping off methanol was diluted with desalted water at a ratio of water to the product equal to 1:3, and passed into separator 7, wherein the mixture was separated into an ester layer, an intermediate layer and a layer containing substantially sodium monomethyl adipate. This last product was passed into evaporator 8 in order to remove water, and the evaporated product was recycled for the preparation of the electrolyte.

The ester layer was diluted with desalted water at a ratio of the ester layer to the water equal to 1:8 and was then hydrolyzed in autoclave 9 at 250° C. under 40 atm. for 2.5 hours. The hydrolysis products after removing methanol in the stripper 10, were hydrolyzed for a second time in an aqueous solution of nitric acid at 90° C. for 1 hour in apparatus 11. The nitric acid was utilized in such amount, that its contents in the solution was 20%. From the solution obtained, sebacic acid was recovered by crystallization. The sebacic acid obtained was dissolved in water, this water solution was purified with activated carbon (not shown in the drawing) at 95° C. for 40 minutes and the final sebacic acid was crystallized and had the following characteristics:

Melting point _____ 134° C.
Acid number _____ 550 mg. KOH/g.
Ester number _____ ~0.

The residual solution of nitric acid after the recovery of sebacic acid, was partly recycled to the second hydrolysis step, and partly removed from the cycle for regeneration of the nitric acid. The intermediate layer, formed by the separation in layers (at their interface) of the mixture, obtained in the course of electrolytic condensation, was separated and used for regeneration of platinum.

The process according to the invention, produces a highly purified sebacic acid having a melting point of 132–134° C., an acid number of 545–550 mg. KOH/g. and an ester number of approximately zero. In addition, the process provides a practically total regeneration of the alkali metal monomethyl adipate and about 70% regeneration of the platinum passing from the anodes into the solution during the electrolytic condensation.

We claim:

1. A process for the production of sebacic acid comprising electrolytically condensing monomethyl adipate to dimethyl sebacate in a methanolic medium in the presence of an alkali metal monomethyl adipate, stripping off the methanol from the obtained mixture; separating said mixture by allowing it to stand and form an ester layer containing substantially dimethyl sebacate and a layer containing substantially alkali metal monomethyl adipate, removing the ester layer, hydrolyzing said ester layer with water at a temperature above 100° C. under superatmospheric pressure and not less than a fourfold excess of water, by weight, with respect to the ester layer, and subsequently subjecting this layer to hydrolysis in an aqueous solution of a mineral acid and recovering the sebacic acid which is formed.

2. A process according to claim 1, wherein the hydrolysis with water is performed under 35–50 atm. at a temperature of 220–280° C., for 2–5 hours, the water to the ester layer weight ratio being between 6:1 and 10:1.

3. A process according to claim 1, wherein the layer containing substantially alkali metal monomethyl adipate is recycled to the electrolytic condensation stage.

4. A process according to claim 1, wherein nitric acid is used as the mineral acid for the subsequent hydrolysis.

5. A process according to claim 4, wherein the nitric acid is utilized in such a quantity that its content in the reaction mixture is 15–25% and the hydrolysis is performed at a temperature of 80–100° C. for 0.5–1.5 hours.

6. A process according to claim 4, wherein the sebacic acid is recovered from the products of hydrolysis, and the residual solution of nitric acid is partly recycled and partly removed to regenerate nitric acid therefrom.

7. A process according to claim 1, wherein the recovered sebacic acid is recrystallized from a water solution.

8. A process according to claim 7, wherein the water solution of sebacic acid is purified.

9. A process according to claim 8, wherein the purification of the water solution of sebacic acid is performed with activated carbon, at a temperature of 90–100° C. for 20–40 minutes.

10. A process according to claim 1, wherein to the mixture of electrolytic condensation products, after stripping off methanol, water is added and then the mixture upon being allowed to stand is separated into an ester layer and a water layer.

11. A process according to claim 10, wherein after stripping off methanol, water is added to the mixture of electrolytic condensation products in such a quantity that the water to the mixture weight ratio is between 1:3 and 1:10.

12. A process according to claim 10, wherein the water layer is evaporated and the saturated solution of alkali metal monomethyl adipate is recycled to the electrolytic condensation stage.

13. A process according to claim 10, wherein the ester layer is subjected to hydrolysis.

14. A process according to claim 10, comprising using platinum or platinum-titanium anodes for the electrolytic condensation, there being formed after stripping off the methanol and adding water, an intermediate layer between the ester layer and the water layer, the process further comprising separating the intermediate layer and regenerating platinum therefrom.

References Cited

UNITED STATES PATENTS

| | | | |
|---|---|---|---|
| 3,193,477 | 7/1965 | Baizer | 204—72 |
| 2,867,569 | 1/1959 | Kronenthal | 204—72 |
| 2,680,713 | 6/1954 | Lindsey et al. | 204—59 |
| 2,439,425 | 4/1948 | Gresham | 204—72 |

OTHER REFERENCES

Annalen der Chemie, 1891, 261 Band, pp. 121–122.

HOWARD S. WILLIAMS, Primary Examiner

R. L. ANDREWS, Assistant Examiner